M. HAEBERLEIN.
FLY BALL GOVERNOR.
APPLICATION FILED JULY 5, 1919.
1,352,189.
Patented Sept. 7, 1920.
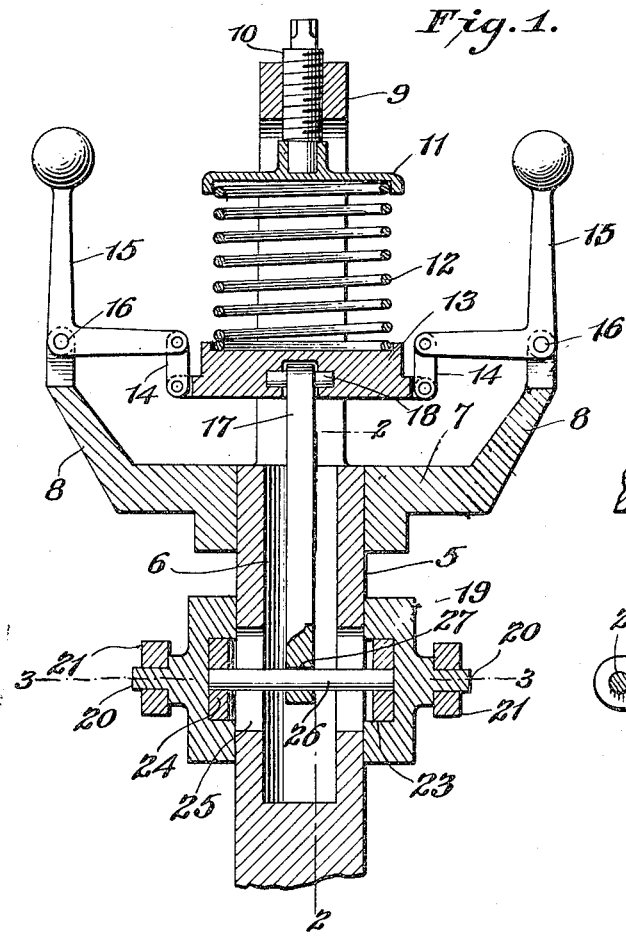
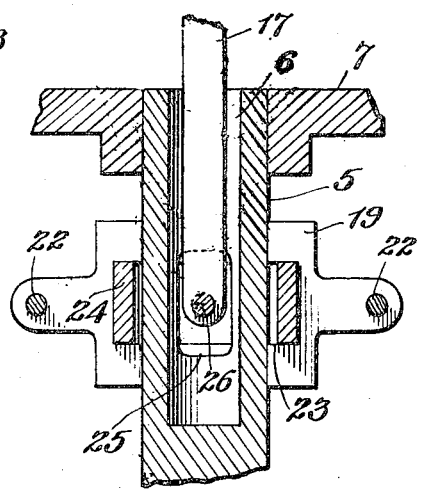
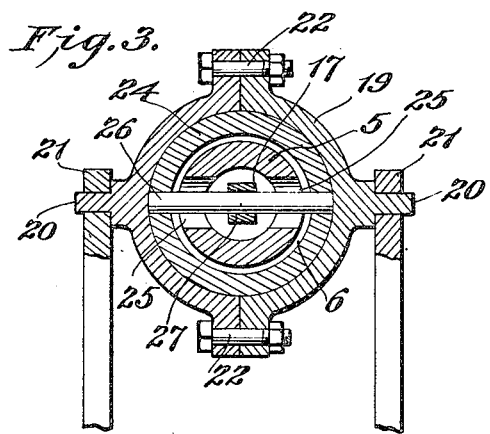
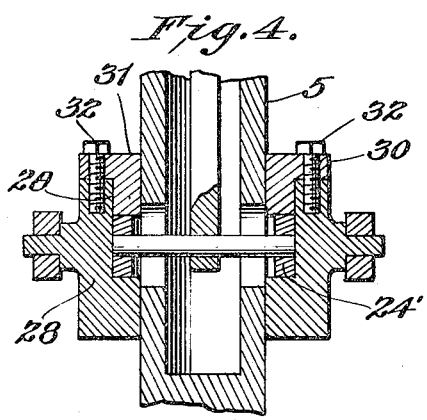
INVENTOR
Max Haeberlein,
BY C. P. Goepel
ATTORNEY

UNITED STATES PATENT OFFICE.

MAX HAEBERLEIN, OF MOUNTAIN LAKES, NEW JERSEY.

FLY-BALL GOVERNOR.

1,352,189.  Specification of Letters Patent.  Patented Sept. 7, 1920.

Application filed July 5, 1919. Serial No. 308,853.

*To all whom it may concern:*

Be it known that I, MAX HAEBERLEIN, a citizen of the United States, and a resident of Mountain Lakes, in the county of Morris and State of New Jersey, having invented certain new and useful Improvements in Fly-Ball Governors, do hereby declare that the following is a full, clear, and exact description of the same.

This invention relates to fly ball governors, and has for its primary object to provide certain improvements in a governor of this type, such for instance, as is disclosed in my prior Patent No. 941,775, issued November 30, 1909, whereby the operating connections between the fly ball levers of the governor and the speed control means will be rendered highly sensitive so that the very best possible speed regulation may be obtained.

It is another and more particular object of my invention to provide an improved mounting and arrangement of the rotatable part which is connected to the fly ball levers through the spindle, whereby frictional resistance to the free axial movement of said part is practically eliminated.

In the accomplishment of the above purpose, I provide a collar surrounding the rotating spindle, freely shiftable in an axial direction with respect thereto but held against rotation by lever connections between said collar and the speed determining mechanism, a freely rotatable sleeve mounted within the collar, and means extending through the spindle and operatively connecting said sleeve to the fly ball levers which are mounted upon the upper end of the spindle.

With the above and other objects in view, the present invention consists in an improved fly ball governor, as above characterized, and in the construction, combination and relative arrangement of its several parts, as will be hereinafter more fully described, illustrated in the drawing, and subsequently incorporated in the appended claims.

Referring to the drawing wherein I have illustrated one practical embodiment of the invention, and in which similar reference characters designate corresponding parts throughout the several views, Figure 1 is a longitudinal sectional view through a fly ball governor constructed in accordance with one embodiment of the invention;

Fig. 2 is a section taken on the line 2—2 of Fig. 1;

Fig. 3 is a horizontal section taken on the line 3—3 of Fig. 1; and

Fig. 4 is a detail vertical section illustrating a slightly modified construction.

Referring in detail to the drawing, 5 designates the spindle of my improved governor, which is suitably geared to a motor of any type and follows the speed changes thereof. At its upper end the spindle is formed with a central bore 6 and to said upper end of the spindle a disk 7 is suitably secured for rotation therewith and is formed at diametrically opposite points with the upwardly projecting outwardly inclined arms 8. A U shaped bar or bridge element 9 is integrally connected at its ends with the plate 7 and in the middle or central portion of this bar an adjustable screw 10 is threaded. The lower end of said screw is rotatably engaged in a central boss formed upon the cap plate 11, with which the upper end of the coil spring 12 is engaged. 13 designates a base plate having a seat for the lower end of the spring 12. Links 14 connect this base plate at diametrically opposite points to the inwardly extending arms of the fly ball levers 15, which are fulcrumed as at 16 upon the upper ends of the arms 8. A link bar 17 is pivotally connected at its upper end as shown at 18 to the base plate 13 and extends downwardly into the bore 6 of the spindle 5.

It is to be understood that the foregoing description of the mounting and arrangement of the centrifugally actuated fly ball levers constitutes no essential part of the present improvements, and if desired, in lieu of the arrangement above disclosed, I may employ the mounting and construction shown and described in my prior patent hereinbefore referred to.

In the construction disclosed in my former patent, and in various other types of such fly ball governors heretofore employed, a sleeve is mounted on the governor spindle in frictional contact therewith and through the medium of pin and link connections between this sleeve and the fly ball levers, the sleeve is rotated synchronously with the spindle. It follows, therefore, that any axial movement of the sleeve is strongly resisted by static friction between the sleeve and the spindle. The collar engaged in a groove in the outer face of the sleeve and connected to the speed control levers has a tendency, through frictional contact, to rotate therewith, thus causing the levers to transmit a frictional pressure through the sleeve against the periphery of the spindle and thereby increase frictional resistance to the axial movement of the sleeve. Such resistance to the free movement of the collar is very detrimental to the sensitive action of the governor and good speed regulation is therefore impossible in such a construction.

It is therefore my purpose to obviate the above noted objection by a very simple rearrangement of the various elements, and to this end I provide a collar 19 surrounding the spindle 5, having a loose sliding and rotatable fit thereon, there being practically no frictional resistance to the axial movement of this collar. It will be understood from this construction that the spindle has free rotative movement within the collar and there is no positive frictional contact of the collar upon the periphery of the spindle, so that the lever connections 21 will not be placed under strain. Therefore, if the levers were disconnected from the collar and the link 17 disconnected from the centrifugal means, the collar would drop by gravity upon the spindle. The collar is formed in two similar semi-circular sections each having a trunnion 20 projecting centrally from its outer side with which one of the levers 21 is pivotally engaged. These levers are operatively connected in any approved manner to the speed determining mechanism (not shown). The sections of the collar 19 are connected at their abutting ends by means of suitable clamping bolts 22. Each of these collar sections is provided in its inner face with a continuous channel or groove 23. These channels receive a sleeve 24 which is freely rotatable therein. The inner diameter of this sleeve is appreciably greater than the diameter of the spindle 5 so that the sleeve does not come in contact with the spindle, thus eliminating all friction between the sleeve and spindle. As the spindle rotates within the bore of the collar 19, which collar is prevented from rotating by reason of the lever or other operating connections between said collar and the speed controlling mechanism, it is evident that the axial movement of said collar will not be resisted in accordance with the well known law of mechanics, by static friction, which in the present improvement is non-existing. The wall of the spindle at the lower end of the bore 6 is formed at diametrically opposite sides with slots 25 to receive a pin 26, the ends of which are fixed in diametrically opposite sides of the sleeve 24. This pin is loosely engaged through an opening 27 in the lower end of the link 17.

From the above description it will be readily seen that in the operation of the governor, under normal conditions, the collar 19 remains stationary, while the sleeve 24 rotates synchronously with the spindle, through the connections between said sleeve and the fly ball levers, within the sectional collar. When the load is increased or decreased, the fly ball levers are actuated by centrifugal force and through the medium of the connecting link 17, the collar 19 within which the rotating sleeve 24 is inclosed, is shifted axially upon the spindle 5 so that the lever connections 21 will be actuated and the operating speed changed accordingly.

In comparing the present improvement as above described with analogous devices in the prior art, it will be seen that instead of frictionally engaging the sleeve upon the spindle for rotation therewith, the collar to which the levers are connected is guided upon the spindle while the sleeve is without frictional contact upon the periphery of the spindle. In other words, there is a relative rotary movement between the collar and the spindle as well as a relative axial movement. Owing to the fact that there is free relative rotation between the spindle and collar, during the axial movement of the latter, the influence of frictional contact between the parts induced by pressure exerted through the lever connections to the collar in a line at right angles to the spindle axis, which tends to resist such axial movement of the collar, is reduced to a minimum. Thus, as the sleeve 24 is also disposed out of frictional contact with the spindle, the present improvement renders the device instantly responsive to slight variations in load.

If desired, in lieu of the sectional construction of the collar 19, whereby the rotating sleeve may be assembled within said collar, this collar may be constructed as shown in Fig. 4 of the drawing with a continuous body section 28 which is counterbored as at 29 to receive the rotating sleeve 24'. The cap section 30 for the collar is provided with an annular flange 31 extending into the counterbore 29 to hold the sleeve against longitudinal shifting movement, said cap section being detachably secured to the body of the collar by a plurality of clamping bolts 32. With either of these alternative collar constructions, it will be apparent that the parts can be very easily and quickly assembled upon the spindle of the governor.

From the foregoing description considered in connection with the accompanying drawing, the construction, manner of operation and several advantages of my improved fly ball governor will be clearly understood. I have found that by reason of such improvements, the governor connection is rendered highly sensitive so that in the least variation of load the operating speed will be changed accordingly, whereby unnecessary consumption of power is effectively obviated. It will also be observed that I have attained this improved result without greatly complicating my original governor construction or increasing the manufacturing cost thereof. The improved operating connections between the fly ball levers and the levers for actuating the speed changing means may be adopted and applied to a governor operating in either a vertical or horizontal position.

While I have herein illustrated and described several embodiments of my invention which I believe to be desirable in practice, it is nevertheless to be understood that the device may also be exemplified in various other alternative constructions and I accordingly reserve the privilege of adopting all such legitimate changes as may be fairly embodied within the spirit and scope of the invention as claimed.

I claim:

1. In a governor, a rotatable spindle, fly ball levers mounted on said spindle, a collar freely slidable longitudinally upon the spindle in immediate juxtaposed relation thereto, but normally free from static frictional contact with the spindle, speed control means connected to said collar, and means connected to the interior of the collar and to the fly ball levers to shift said collar upon the rotating spindle and actuate the speed control means.

2. In a governor, a rotatable spindle, fly ball levers mounted on said spindle, a non-rotatable collar loosely surrounding said spindle and axially movable relative thereto, said collar having an internal annular groove, a sleeve freely rotatable in said groove, and having an internal diameter greater than the diameter of the spindle, levers to operatively connect said collar to speed control means, and means operatively connecting said sleeve to the fly ball levers.

3. In a governor, a rotatable spindle, fly ball levers mounted on said spindle, a non-rotatable collar surrounding said spindle and axially movable relative thereto, said collar having an internal annular groove, a sleeve freely rotatable in said groove, and having an internal diameter greater than the diameter of the spindle, levers to operatively connect said collar to speed control means, said spindle being provided at its upper end with a bore and diametrically opposed slots communicating therewith, a pin fixed at its ends in the rotatable sleeve and extending through said slots, and a link connection between said pin and the fly ball levers whereby the collar is shifted axially on the spindle in the movement of said levers.

In testimony that I claim the foregoing as my invention, I have signed my name hereunder.

MAX HAEBERLEIN.